United States Patent [19]

Bogatin et al.

[11] Patent Number: 4,816,811
[45] Date of Patent: Mar. 28, 1989

[54] COMPLIANT OVERLAY FOR USE AS AN OPTICALLY-BASED TOUCH-SENSITIVE SCREEN

[75] Inventors: Eric L. Bogatin, Menlo Park, Calif.; Xina S. Quan, Bridgewater, N.J.; Thomas A. Schwartz, Red Bank, N.J.; Wesley P. Townsend, Princeton, N.J.

[73] Assignees: American Telephone and Telegraph Company; AT&T Technologies, Inc., Murray Hill, both of N.Y.; AT&T Information Systems Inc., Del.; AT&T Bell Laboratories, Murray Hill, N.Y.

[21] Appl. No.: 715,280

[22] Filed: Mar. 15, 1985

[51] Int. Cl.$^4$ ............................................. G09G 1/00
[52] U.S. Cl. ...................................... 340/712; 178/18; 741/31
[58] Field of Search ..................... 340/712, 706, 365 P; 178/18; 200/5 A, 86 R

[56] References Cited

U.S. PATENT DOCUMENTS

| | | | |
|---|---|---|---|
| 4,017,848 | 4/1974 | Tannas, Jr. | 340/712 |
| 4,310,839 | 1/1982 | Schwerdt | 340/712 |
| 4,360,716 | 11/1982 | Fiorella | 364/709 |
| 4,427,861 | 1/1984 | Stillie | 200/159 B |
| 4,455,450 | 6/1984 | Margalin | 178/18 |
| 4,484,179 | 11/1984 | Kasday | 340/365 P |
| 4,511,620 | 4/1985 | Kroupa et al. | 428/220 |
| 4,528,243 | 7/1985 | Kookoatsedes | 428/425.5 |
| 4,529,789 | 7/1985 | Kroupa | 528/15 |
| 4,535,141 | 8/1985 | Kroupa | 528/15 |
| 4,542,375 | 9/1985 | Alles et al. | 340/365 P |

OTHER PUBLICATIONS

IBM Technical Disclosure Bulletin, vol. 24, No. 6, Nov. 1981, "Optical Overlay Input Device for a Cathode Ray Tube".
"Transflex", TM Advertisement, Sierracin Corporation, 1979.
P. Callens, "Optical Keyboard Device and Technique," *IBM Technical Disclosure Bulletin*, vol. 26, No. 6, Nov. 1983, pp. 2763-2764.
U.S. patent application Ser. No. 347,877 by H. G. Alles et al., filed Feb. 11, 1982, allowed Apr. 29, 1985.

*Primary Examiner*—Marshall M. Curtis
*Attorney, Agent, or Firm*—Frederick B. Luludis

[57] ABSTRACT

A resilient and deformable touch screen that is adapted to be overlaid on the surface of a CRT screen is formed from a semi-rigid plastic frame attached to a flexible plastic pouch filled with a soft resilient material which adheres to the surface of the pouch.

6 Claims, 2 Drawing Sheets

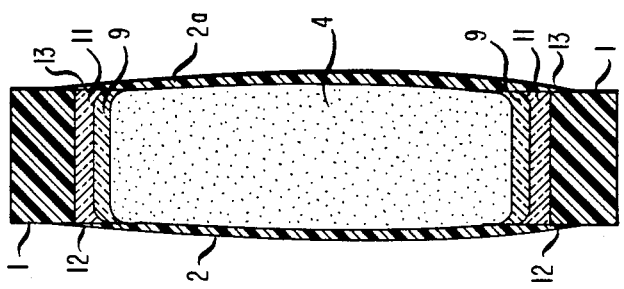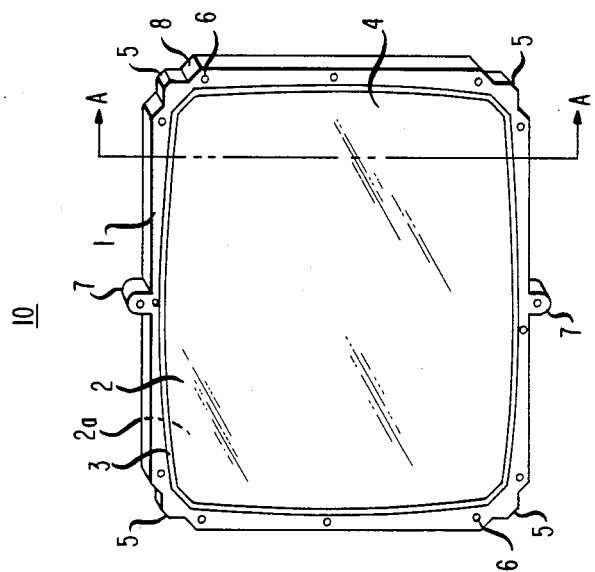

COMPLIANT OVERLAY FOR USE AS AN OPTICALLY-BASED TOUCH-SENSITIVE SCREEN

TECHNICAL FIELD

This invention relates to compliant overlays for optically-based touch-sensitive screens.

BACKGROUND OF THE INVENTION

U.S. Pat. No. 4,484,179 issued to L. R. Kasday discloses, inter alia, an optically-based touch-sensitive touch screen for determining the position of a finger touch on the surface of a CRT screen. This arrangement includes a transparent, compliant surface which overlays the surface of the CRT screen and through which light from the CRT may pass. When a point on the compliant overlay is touched, light from the phosphorescent CRT screen becomes trapped within the overlay by total internal reflection. This trapped light travels to the edge of the overlay where it is detected by photodiodes. Since total internal reflection of light originating from a point under the finger occurs at the time the CRT raster beam passes under the finger, the raster beam timing can be used in conjunction with the signals outputted by the photodiodes to determine the position of the touch.

The level of light signals that become trapped within the compliant overlay when it is touched is a function of the degree to which the overlay deflects. Disadvantageously, then, a relatively non-compliant overlay will only trap a low level of light signals, resulting in a relatively low photodiode signal level. This, in turn, would necessitate expensive signal detection circuits to process the low-level photodiode signals, thereby adding to the cost of the optically-based touch screen.

Accordingly, a desirable characteristic of an optically-based touch screen is that it deflects substantially when it is touched by the user with a relatively low level of force, thereby increasing the level of trapped light and, hence, the level of the resulting photodiode signals to a point where the latter signals can be processed inexpensively. The above-mentioned Kasday patent suggests using silicone rubber for the compliant overlay. While this material is somewhat soft, the user nonetheless must apply an uncomfortable level of force to the silicone material to increase the level of trapped light to a point where the resulting photodiode signals can be processed using inexpensive detection circuits. Although materials that are softer than silicone rubber are easy to deflect and hence trap a higher level of light signals when they are touched, they are, for the most part, nonetheless unacceptable as a compliant overlay, since such materials disadvantageously tear easily when they are stressed and are also tacky. A material that is tacky sticks to the surface of the CRT screen and is easily marked by fingerprints.

SUMMARY OF THE INVENTION

We have recognized that a soft compliant overlay is achievable, one which substantially deflects when touched and one which can be used with inexpensive detection circuits, by forming, in accordance with the invention, an overlay pouch from two semirigid, or flexible, plastic sheets that is filled with a gel. In accordance with a feature of our invention, the gel-filled pouch may be attached to a semirigid plastic frame to hold it taut and to provide an easy way of attaching it to the face of a CRT screen.

In one embodiment of our invention, the inside perimeter of the pouch is coated with a primer to promote adhesion between the gel and the other elements of the overlay and is caulked with a barrier coating to eliminate nucleation sites so that bubbles do not form in the pouch.

BRIEF DESCRIPTION OF THE DRAWINGS

FIG. 2 illustrates the embodiment of FIG. 1 in greater detail;

FIG. 3 is a cross-section view of the compliant overlay shown in FIG. 2; and

GENERAL DESCRIPTION

In a raster-scanned CRT, the beam of electrons from the CRT electron gun impinge on the phosphorescent screen of the CRT in a sequential pattern, line by line, from top to bottom. As the electrons hit the phosphorescent screen of the CRT, the surface glows. By controlling the deflection of the raster beam using, for example, a CRT controller, it is possible to create images, or targets, representative of numbers or letters in any position on the CRT screen.

In an optically-based touch screen of the type disclosed in the above-mentioned Kasday patent in which the touch screen overlays the face of the CRT screen, the CRT controller is arranged to display on the CRT screen a target, calling for user response. The target may be touched by the user's ringer or some other device held by the user. If the user touches the displayed target, the touch deflects the compliant touch-screen overlay, thereby causing light signals from the displayed target to become trapped within the compliant overlay by total internal reflection. The level of trapped signals that become trapped within the overlay is a function of the degree to which the overlay deflects when it is touched, as mentioned above. We have found that the compliant overlay disclosed in the above-mentioned Kasday patent disadvantageously requires expensive signal detection circuits in order to determine when the overlay is touched. Inexpensive signal detection circuits can be used with this overlay, but such circuits require the user to exert an uncomfortable level of force to the overlay in order to generate the desired level of trapped light. Accordingly, a very soft material appears to be the preferred overlay. As mentioned above, however, typical known soft materials tear easily and are tacky.

In accordance with the invention, we avoid the problems exhibited by prior art compliant overlays by forming a highly resilient and depressible, or deformable, overlay from two semirigid, illustratively plastic, sheets which are formed into a sealed pouch, or envelope, and filled with a clear gel-like material. We have found that our overlay is user-friendly and requires less than 200 grams of force to deflect it to a point to cause a substantial level of light to become trapped within the overlay. This level of trapped light is easily processed using inexpensive signal detection circuits, such as the circuitry disclosed in the co-pending application of P. S. DiPiazza et al entitled "Adaptive Thresholding Scheme for Optically-Based Touch Screens," U.S. Ser. No. 715,278, filed of even date herewith.

In accordance with a feature of our invention, the overlay pouch is attached to a semirigid plastic frame so that the overlay can be illustratively pinned to the face of the CRT without damaging the overlay itself.

Figure 1:
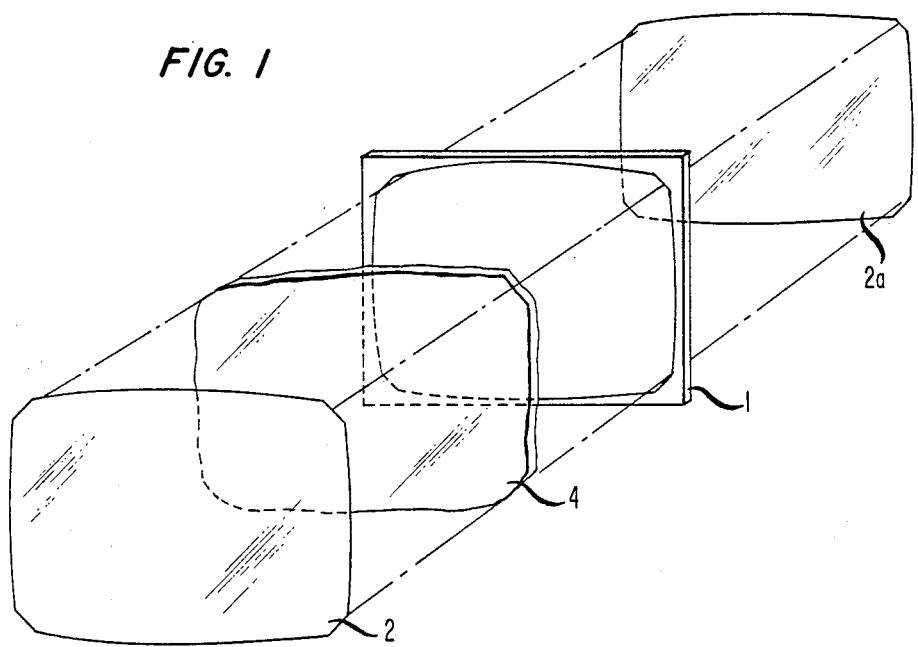
FIG. 1 is an exploded view of a compliant overlay embodying the principles of our invention.

To illustrate the foregoing, there is shown in FIG. 1 a simplified version, in exploded view, of a compliant overlay 10 embodying the principles of the invention. To form overlay 10, the perimeters of semirigid plastic sheets 2 and 2a are heat-sealed to respective sides, or surfaces, of semirigid plastic frame 1, except for one or two short lengths around the perimeter of plastic sheet 2, which are left unsealed to serve as an opening, or filler port (not shown). The pouch thus formed between plastic sheets 2 and 2a is filled with a body of transparent plastic gel 4 through the filler port. The pouch is overfilled at this point in order to expel any air that may be contained in the overlay pouch.

Overlay 10 is thereafter degassed by placing it in a book mold in which there is created a suction, or vacuum of illustratively 28 inches of mercury to expel any remaining air that may be trapped within the overlay pouch. The book mold also presses out the excess gel 4 from the pouch to form overlay 10 into the desired shape and seals the filler port, or ports, formed between sheet 2 and frame 1.

When overlay 10 is removed from the book mold, a pressure differential exists between the inside and outside of the overlay pouch. This pressure differential is equalized by the slow diffusion of air into the pouch through plastic sheets 2 and 2a and through plastic frame 1. The air that enters the overlay pouch diffuses into gel 4 such that it does not form any air bubbles. We have recognized, however, that air bubbles could form in the overlay pouch thereafter when the pressure inside the overlay pouch exceeds the outside pressure, which can occur if, for example, overlay 10 is transported by an airplane flying at a high altitude. These bubbles form when air leaves gel 4 in order to equalize the pressure differential between the inside and outside of the overlay pouch.

Air, or other gasses, diffuse rapidly through gel 4 but diffuse very slowly through plastic sheets 2 and 2a and through plastic frame 1. The diffusion of air thus slows down considerably when it reaches the perimeter, or interface, between gel 4 and plastic sheets 2 and 2a and frame 1. If nothing were done to preclude it, the air that reaches the perimeter of the overlay pouch could collect and form a bubble at a nucleation site, which might be present at the interface of sheets 2 and 2a and frame 1. A nucleation site can be characterized as being a "rough spot" on the surface of a material, such as the "rough spots" that could be formed by the sealing process. We have found that once a bubble forms in the overlay pouch, it remains at the nucleation site after the pressure differential between the inside and outside of the filled pouch has equalized. If the air bubble is not attended to, it will expand over time, thereby degrading the performance and cosmetic appeal of overlay 10.

In accordance with a feature of the invention, and as described in more detail hereafter, we deal with this problem by applying what we call a barrier coating to the inside of frame 1 and to a margin around the perimeter of flexible plastic sheet 2a and of flexible plastic sheet 2 before the latter are sealed to frame 1. We have found that the barrier coating, which forms a hard, smooth surface, eliminates nucleation sites around the sealed perimeter and, therefore, prevents bubbles from forming thereat.

DETAILED DESCRIPTION

FIG. 2 illustrates the embodiment of FIG. 1 in further detail and in non-exploded view. As in FIG. 1, the arrangement includes semirigid plastic frame 1, semirigid plastic sheets 2 and 2a and gel 4. The arrangement of FIG. 2 also includes other elements as will be discussed hereinafter.

Specifically, plastic frame 1 is formed from illustratively semirigid plastic, for example, Estane polyurethane 5750 available from B. F. Goodrich, Inc., by injecting the polyurethane into a mold that is specially tooled to mold the plastic into the shape of frame 1. The height and width of frame 1 are at least illustratively 7.2 inches and 9.2 inches, respectively, which somewhat matches the dimensions of an 9-inch CRT screen. The injection mold is also tooled to form a plurality of holes 6 and tabs 7 on frame 1. As will be explained below, overlay 10 is held taut to a CRT bezel by pins which are formed in the bezel and which pass through holes 6. Tabs 7 can be used to remove overlay 10 from the bezel if desired. The tooling of the injection mold is also arranged to bevel the corners of frame 1 and to form a beveled protuberance 5 at each beveled corner 8. Each protuberance 5 serves as an output port at which a photodiode is placed to receive light signals that become trapped within overlay 10 when it is overlaid on the face of a CRT screen.

Plastic sheets 2 and 2a are illustratively extruded polyurethane, for example, Estane polyurethane 58887 available from B. F. Goodrich, Inc. The perimeter of sheet 2a is heat sealed to frame 1 first to form a tub in which a silicone primer, for example, vinyl siloxane silicone primer P1B, available from Dow Corning Corporation is painted around the inside edge of frame 1 and around the interface between frame 1 and sheet 2a. The silicone primer promotes adhesion between polyurethane frame 1 and the gel to be added and between polyurethane sheets 2 and 2a and the gel. Without the silicone primer, the gel could separate from polyurethane frame 1 or separate from polyurethane sheets 2 and 2a, thereby degrading the cosmetics and performance of overlay 10.

As will be explained below in detail, the interface between frame 1 and sheet 2a as well as the inside edge of frame 1 is caulked with a barrier coating. An edge, or margin, of polyurethane sheet 2 is also painted with silicone primer before sheet 2 is heat sealed to frame 1. When sheet 2 is heat sealed to frame 1, a small opening is left between sheet 2 and frame 1 to serve as a gel filler port.

Overlay 10, as thus constructed, is placed in a book mold and the pouch formed between polyurethane sheets 2 and 2a is filled with gel 4, via the filler port left between sheet 2 and frame 1. Gel 4 can be the silicone gel which was obtained from Dow Corning Corporation under the designation XCF3-9610 and is of the type having a two-part vinyl addition cure polysiloxane with a platinum catalyst and a large excess of hydride groups and which can be cured at room temperature or cured at a thermally accelerated rate so that the gel is similar in hardness and resilence to Dow Corning Corporation 3-6527 silicone dielectric gel. The overlay pouch is overfilled to expel air that is contained within the overlay pouch. The book mold presses out the excess gel to form the pouch into its desired shape. During the time that overlay 10 is pressed, it is also being degassed by creating a suction within the book mold. Following the degassing step the filler port between sheet 2 and frame 1 is sealed. Overlay 10 is then heat treated (cured) at approximately 65 degrees centigrade for 2–3 hours.

Any pressure differential between the inside and the outside of the overlay pouch is equalized when air slowly diffuses through polyurethane sheets 2 and 2a and mixes with gel 4. As mentioned above, however, air bubbles could form within the overlay pouch at the interface between gel 4 and the interface comprising frame 1 and sheets 2 and 2a when the pressure outside of the overlay pouch falls below the pressure contained within the overlay pouch.

When this occurs, air leaves the silicone gel 4 and diffuses to the boundary, or interface, formed by polyurethane frame 1 and polyurethane sheets 2 and 2a. The diffusion of air slows down at this boundary due to the slow diffusion rate through the polyurethane. If this problem is not dealt with, the air could cluster at nucleation sites around the boundary and thus form into bubbles. These nucleation sites appear at sharp bends in frame 1 and also appear at "rough spots" between the interface of frame 1 and sheets 2 and 2a. In accordance with a feature of the invention, nucleation sites around the boundary formed by frame 1 and sheets 2 and 2a are eliminated by coating this boundary with a silicone rubber barrier coating, for example, silicone rubber type 599 available from Dow Corning Corporation. The barrier coating of silicone rubber acts as an intermediate hard, smooth interface between gel 4 and the interface comprising frame 1 and sheets 2 and 2a, and is free of potential nucleation sites. Air, which diffuses through the barrier coating and which may attach to a nucleation site at, for example, frame 1, is prevented from expanding into a bubble by the relatively hard surface of the barrier coating. This air diffuses back into gel 4 when the outside pressure rises to the level of the pressure contained within the overlay pouch.

Referring now to FIG. 3, there is shown a cross-section of overlay 10 through line A—A. The thickness of the various materials which make up overlay 10 is slightly exaggerated for clarity. The thickness of frame 1 is, however, at least illustratively 0.180 inches. As shown, a portion, or margin, 12, 13 around the perimeter of polyurethane sheet 2, 2a is heat sealed to polyurethane frame 1, respectively, to form a pouch, or enclosure, that is filled with gel 4. It is seen that silicone primer coat 11 is placed as an intermediate layer of material between gel 4 and the polyurethane interface comprising polyurethane frame 1 and polyurethane sheets 2 and 2a. As mentioned above, silicone primer 11 promotes a strong adhesion bond between silicone gel 4 and the interface comprising frame 1 and sheets 2 and 2a. Silicone rubber 9 provides the barrier coating and is also a intermediate layer of material between gel 4 and the polyurethane interface comprised of frame 1 and sheets 2 and 2a.

Figure 4:
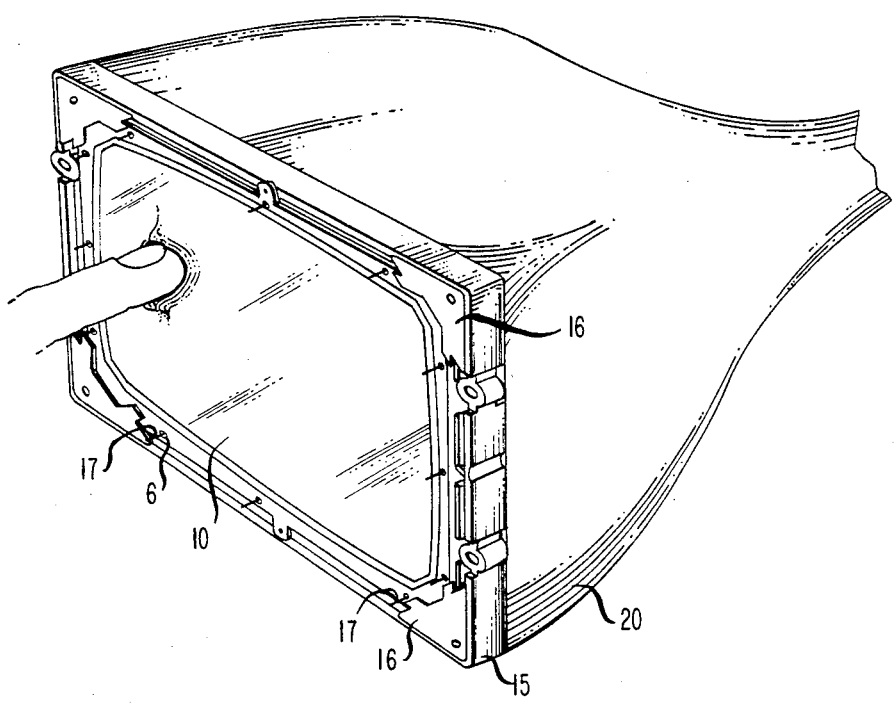
FIG. 4 illustrates the compliant overlay of FIG. 2 attached to the face of a CRT screen.

Referring now to FIG. 4, there is shown overlay 10 attached to CRT bezel 15 which attaches to the face CRT 20, thereby causing overlay 10 to be overlaid on the face, or screen, of CRT 20. It is seen from FIG. 4 that overlay 10 is attached to bezel 15 when pins 17 formed in bezel 15 are inserted through respective holes 6 formed in overlay 10. Each corner of bezel 15 is covered with a metal plate 16 to which enclose a photodiode and other circuitry that are used to receive light signals from images displayed on the face of CRT 20 and which become trapped within overlay 10. The level of light signals that enter overlay 10 at a point that is touched by the user is increased measurably due to the ease in which the overlay deflects, or depresses.

Although a specific embodiment of our invention is shown and described herein, such merely illustrates the principles of the invention. Those skilled in the art will be able to devise other arrangements which, although not specifically shown or described herein, embody these principles and which do not depart from their spirit and scope. For example, frame 1 could be easily eliminated from overlay 10, with the gel-filled pouch formed by plastic sheets 2 and 2a being attached directly to bezel 15 or to the face of CRT 20.

What is claimed is:

1. A touch-sensitive overlay adapted to be overlaid on the face of a display screen, comprising
    a pouch formed from a pair of transparent sheets,
    a body of transparent gel sealed in said pouch, and
    means for attaching said pouch to said display screen.

2. The touch-sensitive overlay set forth in claim 1 wherein said attaching means comprises a frame to which the perimeters of said transparent sheets are sealed to form said pouch.

3. A touch-sensitive overlay adapted to be overlaid on the face of a display screen, comprising,
    a frame,
    a pair of complaint, transparent sheets, said sheets being sealed to respective surfaces of said frame to form a pouch,
    a body of transparent gel sealed in said pouch, and
    means for attaching said frame to said face of said CRT screen.

4. A touch-sensitive screen adapted to be overlaid on the face of a display comprising
    a frame
    a pair of plastic sheets sealed to respective surfaces of said frame to form a pouch,
    a body of gel sealed in said pouch, said gel causing light signals emitted by said display to become trapped within said gel by total internal reflection when said screen is touched by a user and to travel to an outside edge of said frame, and
    a plurality of photodiodes disposed around said outside edge for receiving said light signals.

5. An optically-based touch-sensitive screen in combination with a display comprising
    a frame,
    a pair of transparent sheets sealed to respective surfaces of said frame to form a pouch,
    a body of transparent gel sealed in said pouch, and
    means for attaching said frame to said display.

6. The touch-sensitive screen set forth in claim 5 further comprising a plurality of photodiodes disposed around an outside edge of said frame.

* * * * *

UNITED STATES PATENT AND TRADEMARK OFFICE
CERTIFICATE OF CORRECTION

PATENT NO. : 4,816,811

DATED : March 28, 1989

INVENTOR(S) : Eric L. Bogatin, Xina S. Quan, Emanuele (NMI) Scalco, Thomas A. Schwartz, Wesley P. Townsend It is certified that error appears in the above-identified patent and that said Letters Patent is hereby corrected as shown below:

Column 6, line 34, "complaint" should read --compliant--.
Column 2, line 36, "ringer" should read --finger--.
Column 6, line 4, "which" should be deleted.
Title Page:

Inventors should appear as follows:

(75) Eric L. Bogatin, Menlo Park, California; Xina S. Quan, Bridgewater, N.J.; Emanuele (NMI) Scalco, Cary, N.C.; Thomas A. Schwartz, Red Bank, N.J.; Wesley P. Townsend, Princeton, N.J.

Signed and Sealed this

Sixth Day of March, 1990

*Attest:*

JEFFREY M. SAMUELS

*Attesting Officer*   Acting Commissioner of Patents and Trademarks